United States Patent
Lin et al.

(10) Patent No.: US 9,378,497 B2
(45) Date of Patent: *Jun. 28, 2016

(54) CARD TRANSACTION DEVICE AND CARD TRANSACTION METHOD

(71) Applicant: Smart Approach Co., Ltd., Zhudong Township, Hsinchu County (TW)

(72) Inventors: Hsin-Lung Lin, Zhudong Township (TW); Che-An Chiang, Zhudong Township (TW)

(73) Assignee: Smart Approach Co., Ltd., Zhudong Township (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/803,169

(22) Filed: Jul. 20, 2015

(65) Prior Publication Data

US 2015/0324785 A1    Nov. 12, 2015

Related U.S. Application Data

(63) Continuation-in-part of application No. 14/146,100, filed on Jan. 2, 2014, now Pat. No. 9,208,487.

(30) Foreign Application Priority Data

Sep. 3, 2013   (TW) .............................. 102131613 A (51) Int. Cl.
  *G06Q 20/34*      (2012.01)
  *G06Q 20/32*      (2012.01)
  *G07F 7/08*       (2006.01)

(52) U.S. Cl.
  CPC ........ *G06Q 20/3567* (2013.01); *G06Q 20/3227* (2013.01); *G06Q 20/3272* (2013.01); *G06Q 20/341* (2013.01); *G06Q 20/352* (2013.01); *G07F 7/0873* (2013.01)

(58) Field of Classification Search
  CPC .......... G06Q 20/3567; G06Q 20/3227; G06Q 20/341; G06Q 20/352
  See application file for complete search history.

(56) References Cited

U.S. PATENT DOCUMENTS

| | | | |
|---|---|---|---|
| 7,810,729 B2 | 10/2010 | Morley, Jr. | |
| 8,336,771 B2* | 12/2012 | Tsai ................... | G06K 19/0711 235/380 |
| 2003/0023554 A1* | 1/2003 | Yap ........................ | G06F 3/0224 705/43 |
| 2005/0035190 A1* | 2/2005 | Nanbu ................. | G06Q 20/085 235/379 |
| 2007/0029378 A1* | 2/2007 | Begola ................. | G06Q 20/204 235/380 |
| 2012/0061467 A1* | 3/2012 | Tang ...................... | G06Q 20/32 235/381 |
| 2014/0001264 A1* | 1/2014 | Babu ..................... | G06F 1/3287 235/440 |

* cited by examiner

*Primary Examiner* — Kristy A Haupt
(74) *Attorney, Agent, or Firm* — Alan D. Kamrath; Kamrath IP Lawfirm, P.A.

(57) ABSTRACT

A card transaction device is provided. The card transaction device is configured to be used with a portable electronic device. The card transaction device includes a card reading head, a microcontroller, a security element, a first transmission interface, and a converter. The card reading head is configured to read fundamental information of a card. The microcontroller is electrically connected to the card reading head, the security element and the converter.

15 Claims, 9 Drawing Sheets

CARD TRANSACTION DEVICE AND CARD TRANSACTION METHOD

FIELD OF THE INVENTION

The present invention relates to a card transaction device and a card transaction method, more particularly to a card transaction device having encoding functions and a card transaction method using such a device.

BACKGROUND OF THE INVENTION

The traditional card transaction device is classified into two types: an online card transaction device and an off-line card transaction device. The online card transaction device must be disposed at a fixed location so as to be connected to the internet. For example, the online card transaction device is a credit card machine used in a store or a department store. The off-line card transaction device doesn't need to be disposed at a fixed location, but it still needs to be connected to the back-end systems after reading a card. The off-line card transaction device relies on a post-transaction connection to complete card verification. Because the off-line card transaction device can't immediately verify the card, the risk of receivables would be increased. For example, the off-line card transaction device is a credit card machine used in an airplane.

Currently, some of the published literatures disclose some technical features to solve problems of the traditional card transaction devices, and increase the convenience of card transaction. The techniques disclosed in these literatures also reduce the cost of the traditional card transaction devices. For example, U.S. Pat. No. 7,810,729 titled "Card reader device for a cell phone and method of use" discloses a small card reader device connected to an audio hole of a smart phone, and then the smart phone turns into a mobile credit card machine. The card reader device of U.S. Pat. No. 7,810,729 can be used immediately through internet, and is easy to carry. The technology of the card reader device of U.S. Pat. No. 7,810,729 is configured to convert digital data into audio signals during card transaction. Then, the audio signals are transmitted to the smart phone. Afterward, the smart phone converts the audio signals into the digital data. Finally, the digital data would be uploaded to a database of a bank.

Even though U.S. Pat. No. 7,810,729 titled "Card reader device for a cell phone and method of use" has solved the problems of the traditional card transaction devices as being immobile and incapable of immediate use through internet, the card reader device of U.S. Pat. No. 7,810,729 still has the following drawbacks:

1. The card reader device crashes easily during reading a card or converting digital data into audio signals, and as such it causes a transaction failure. When the card reader device crashes, user needs to reboot it in order for it to work correctly.

2. The fundamental information of the card has not been encoded, so it is cracked easily and not safe.

Therefore, how to design a card transaction device that can reduce the incidence of failure and increase the safety during using is worth considering to a person having ordinary skill in the art.

SUMMARY OF THE INVENTION

One object of the present invention is to provide a card transaction device. The card transaction device can reduce the incidence of failure and increase the safety of paying for transaction.

A card transaction device of the present invention is provided. The card transaction device is configured to be used with a portable electronic device. The card transaction device includes a card reading head, a microcontroller, a security element, a converter, and a first transmission interface. The card reading head is configured to read fundamental information of a card. The microcontroller is electrically connected to the card reading head, the security element and the converter.

In the above card transaction device, the portable electronic device includes a second transmission interface and a transaction processing application software, and the second transmission interface is communicatively connected to the first transmission interface.

A card transaction method of the present invention is provided. The card transaction method is to be used with a card transaction device, and the card transaction device comprises a card reading head, a security element, a converter, and a first transmission interface. The card transaction method comprises the following steps:

a. reading a fundamental information of a card by the card reading head;
b. encoding the fundamental information to generate a encoded data by the security element;
c. converting the encoded data into a transmission signal by converter;
d. transmitting the transmission signal to a portable electronic device via the first transmission interface;
e. reverting the transmission signal into the fundamental information;
f. generating a transaction information;
g. transmitting the fundamental information and the transaction information to a remote database.

A card transaction method of the present invention is provided. The card transaction method is to be used with a card transaction device, and the card transaction device comprises a card reading head, a microcontroller, a security element, a converter, and a first transmission interface. The card transaction method comprises the following steps:

a. reading a fundamental information of a card by the card reading head;
b. encoding the fundamental information to generate a first encoded data by the microcontroller;
c. encoding the first encoded data to generate a second encoded data by the security element;
d. converting the second encoded data into a transmission signal by the converter;
e. transmitting the transmission signal to a portable electronic device;
f. reverting the transmission signal into the fundamental information;
g. generating a transaction information;
h. transmitting the fundamental information and the transaction information to a remote database.

In the card transaction method, the card reading head reads the card by a near field communication method.

DETAILED DESCRIPTION OF PREFERRED EMBODIMENTS

Figure 1:
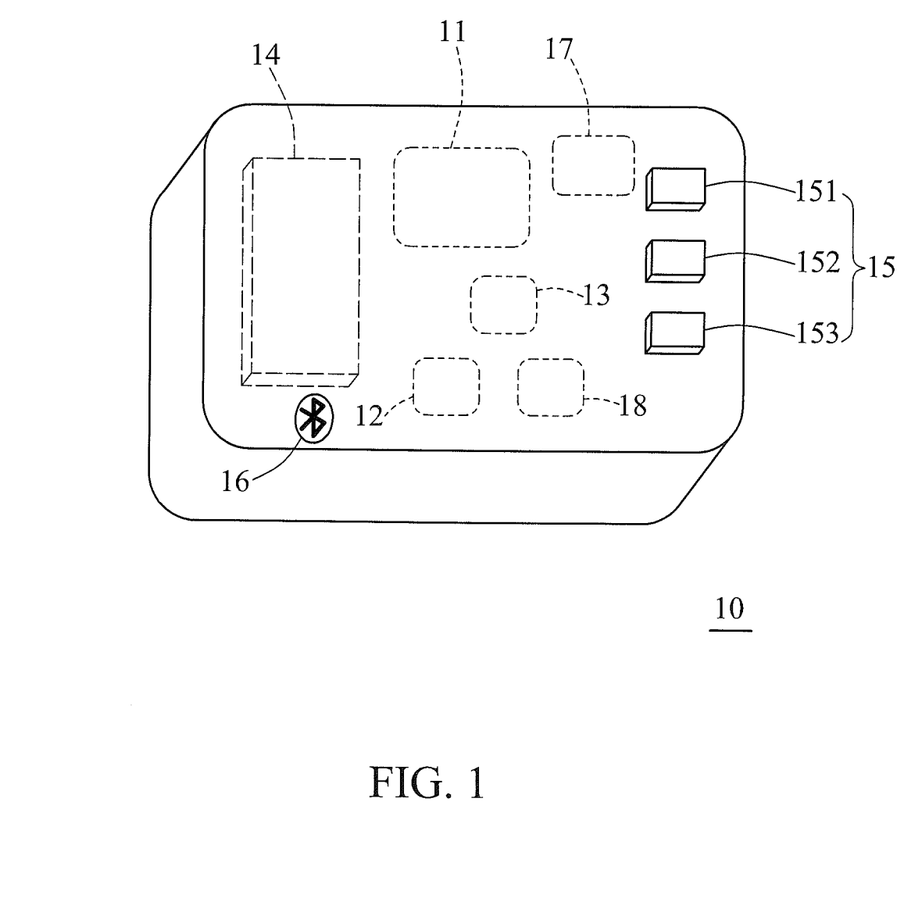
FIG. 1 illustrates a card transaction device 10 in accordance with an embodiment of the present.
Figure 2:
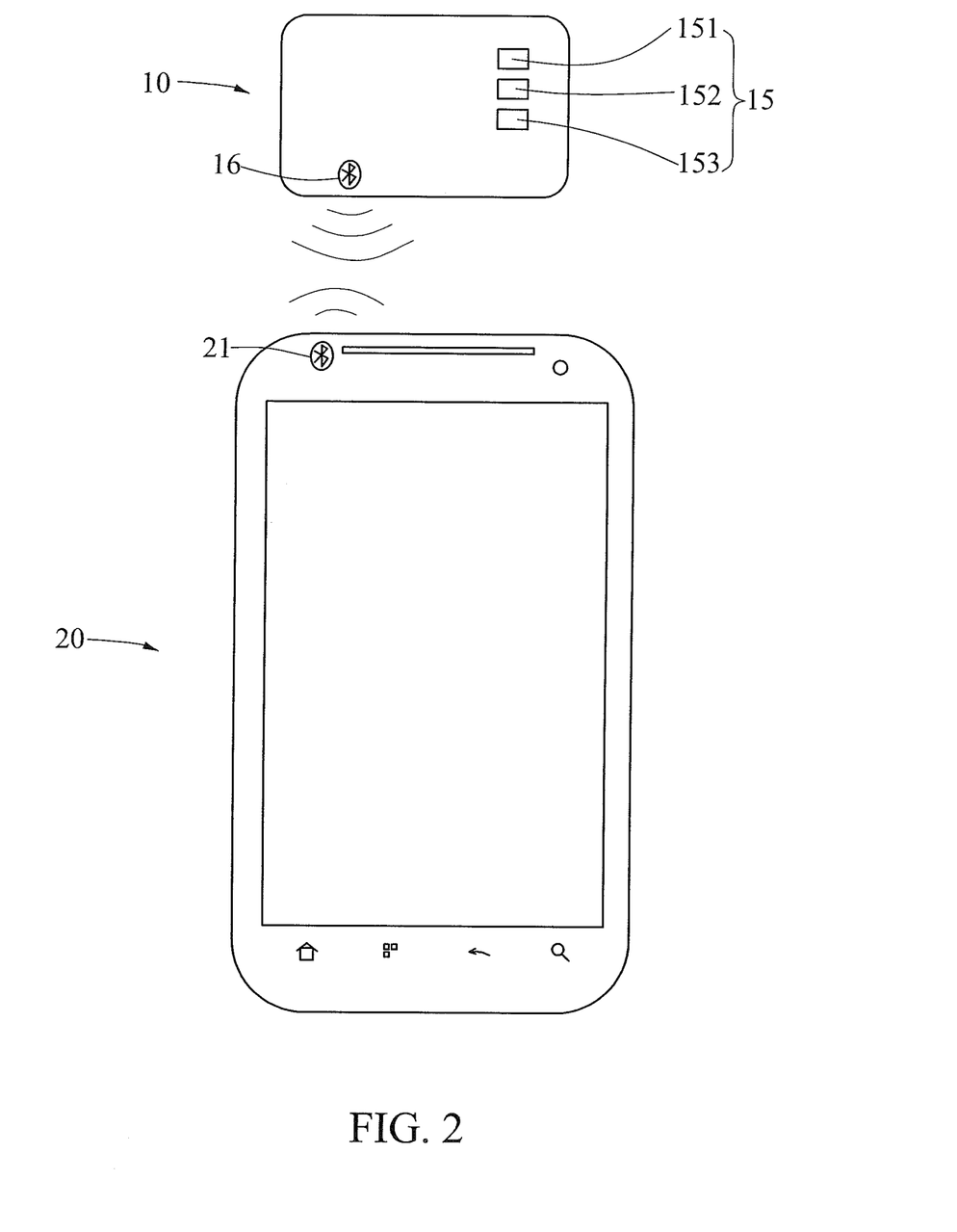
FIG. 2 illustrates a schematic diagram of the card transaction device 10 coupled with the portable electronic device 20 in accordance with an embodiment of the present invention.

Please refer to FIG. 1 and FIG. 2. FIG. 1 illustrates a card transaction device 10 in accordance with an embodiment of the present invention. FIG. 2 illustrates a schematic diagram of the card transaction device 10 coupled with the portable electronic device 20 in accordance with an embodiment of the present invention. The card transaction device 10 is a thin rectangular box-shaped body. The card transaction device 10 has to be connected with the portable electronic device 20 in order to complete the card payment transaction.

The card transaction device 10 includes a card reading head 11, a converter 12, a microcontroller 13, a battery 14, a set of warning lights 15, a first transmission interface 16, a data register 17 and a security element 18. The warning lights 15 is disposed on an external surface of the card transactions device 10, and the first transmission interface 16 is communicatively connected to a second transmission interface 21 of the portable electronic device 20. The card reading head 11, the converter 12, the microcontroller 13, the battery 14, the data register 17 and the security element 18 are disposed in the interior of the card transactions device 10. From the above, the data register 17 for example is a Random Access Memory.

Furthermore, the first transmission interface 16 is for example an audio jack, a USB plug, a HDMI plug, a Video port plug, a Wi-Fi module, a RFID module, a Bluetooth wireless module or an Infrared communication module. The second transmission interface 21 corresponding to the first transmission interface 16 is for example an audio input (corresponding to the audio jack), a USB port (corresponding to the USB plug), a socket of Video port (corresponding to the plug of Video port), a Bluetooth wireless module or an Infrared communication module.

Figure 3:
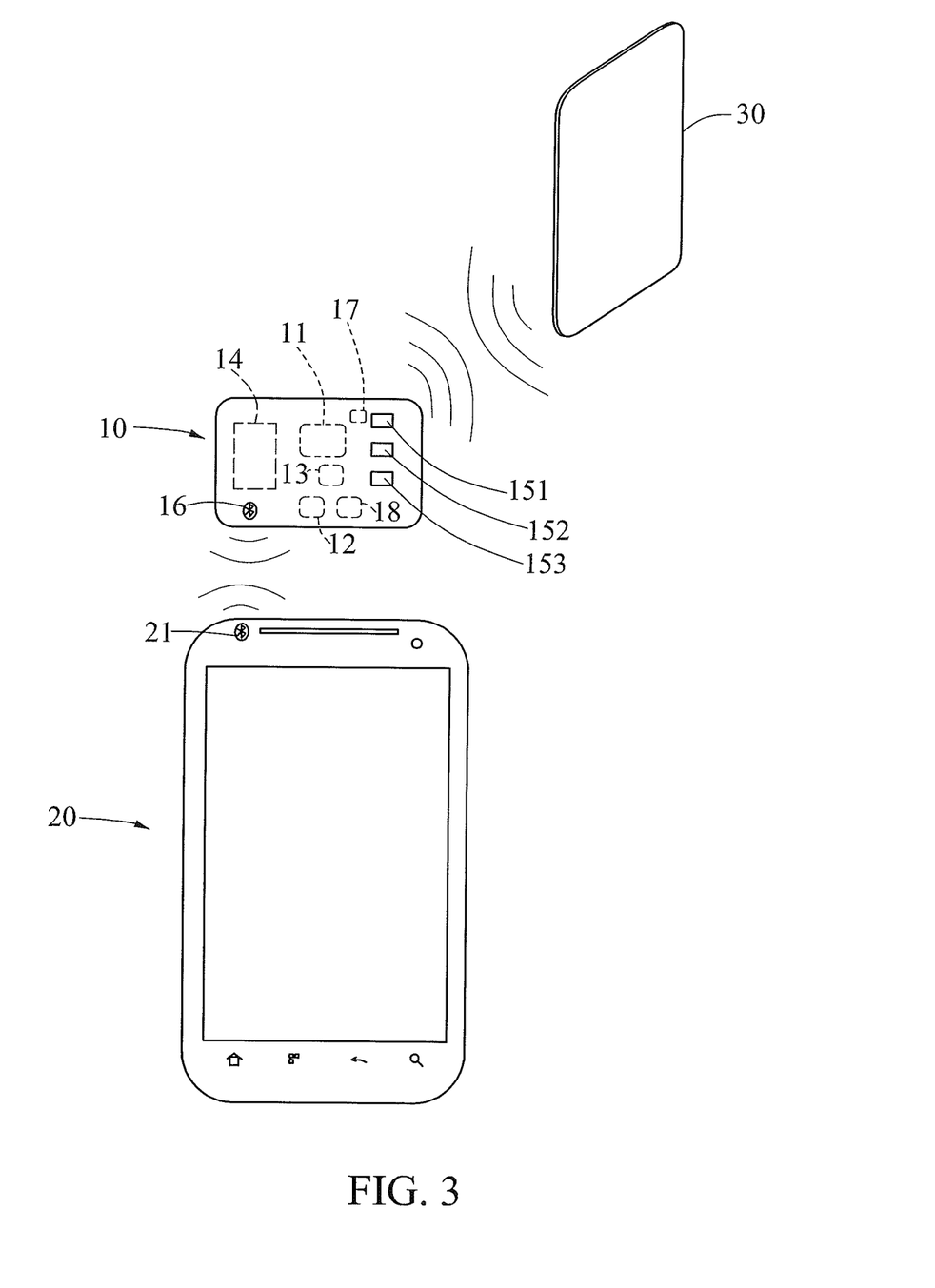
FIG. 3 and FIG. 4 illustrate a schematic diagram of the card transaction device 10 reading the card 30 in accordance with an embodiment of the present invention.
Figure 4:
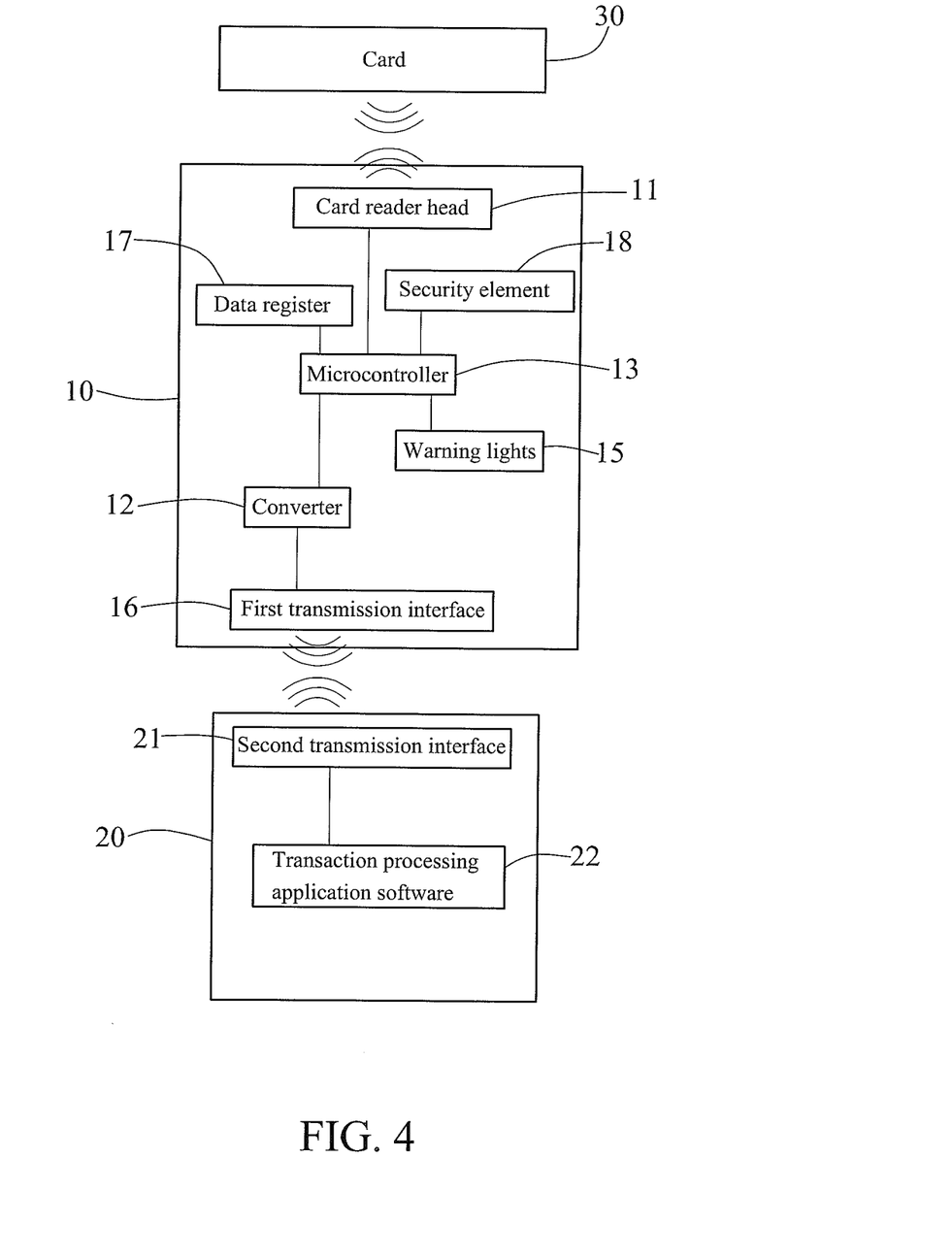

Please refer to FIG. 3 and FIG. 4. FIG. 3 and FIG. 4 illustrate a schematic diagram of the card transaction device 10 reading the card 30 in accordance with an embodiment of the present invention. In this embodiment, the card transaction device 10 is communicatively connected with the electronic device 20 via the Bluetooth wireless module. The portable electronic device 20 is for example a smart phone, a tablet PC or a notebook.

The card reading head 11 is configured to read fundamental information of the card 30. For example, the fundamental information includes at least one of the cardholder information, the cardholder's contact information (cell phone number or E-mail address), the card number and the effective period of the card. The microcontroller 13 of the card transaction device 10 is electrically connected to the card reading head 11, the converter 12, the set of warning lights 15, the data register 17 and the security element 18. The microcontroller 13 periodically detects the card reading head 11, the converter 12 and the set of warning lights 15 in order to determine whether the card reading head 11, the converter 12 and the set of warning lights 15 is operating normally. For example, every 15 minutes, the microcontroller 13 detects the card reading head 11 in order to determine whether the card reading head 11 is operating normally. If the microcontroller 13 finds the card reading head 11 crashed, the microcontroller 13 would reboot the card reading head 11 (the card reading head 11 is rebooted once). And then, the card reading head 11 is restored to operate.

Contrary to the card reader device of U.S. Pat. No. 7,810,729, the card transaction device 10 of the present embodiment is configured to use the microcontroller 13 to control the operation of the card reading head 11 and the converter 12, so the card transaction device 10 doesn't crash easily during using it, therefore the chance of unsuccessful transaction is decreased. From the above, the card 30 is for example a debit card, a cash card, a credit card or a stored value card that has a data stored-value function.

Moreover, the microcontroller 13 is configured to encode the fundamental information to generate a first encoded data. And then, the security element 18 is configured to encode the first encoded data to generate a second encoded data. The second encoded data is saved in a data register 17. And then, the second encoded data would be turned into a transmission signal by the converter 12.

The first transmission interface 16 would transmit the transmission signal to the portable electronic device 20 via the communicative connection between the first transmission interface 16 and the second transmission interface 21. In the process of transmitting the transmission signal from the first transmission interface 16 to the portable electronic device 20, Trojans embedded in the portable electronic device 20 may steal the transmission signal from the second transmission interface 21. Because the fundamental information of the card 30 has been encoded by the card transaction device 10 at least twice (that is: two encryptions), the transmission signal is difficult to be reverted to the fundamental information of the card 30 even in a case where the transmission signal is stolen.

In addition, encoding specification of the security element 18 and the microcontroller 13 is set by the portable electronic device 20. The portable electronic device 20 may from time to time update the encoding specification through the first transmission interface 16 and the second transmission interface 21, and further reduce the risk of the fundamental information being cracked.

Furthermore, the power of the card transaction device 10 of the embodiment is supplied by the battery 14. The battery 14 is preferably a lithium battery. When the battery 14 stops supplying power to the data register 17, the second encoded data saved in the data register 17 would disappear.

The set of warning lights 15 includes a first color light LED 151, a second color light LED 152, and the third color light LED 153. When the capacity of the battery 14 is less than certain threshold value, for example, a quarter of the fully charged capacity, the microcontroller 13 would start the first color light LED 151, and make it light up in order to remind the user to charge the card transaction device 10.

When the card reading head 11 is reading the card 30, the microcontroller 13 would start the second color light LED 152, and the user would know that the card reading head 11 is reading the fundamental information of the card 30. When the card reading head 11 is in a standby state, the microcontroller 13 would start the third color light LED 153, and make it light up. The user can know the card transaction device 10 is in a functioning state when the third color light LED 153 lights up.

Further, the portable electronic device 20 needs to download a transaction processing application software 22. The transaction processing application software 22 can decode the transmission signal converted by the converter 12, so that the transmission signal can be reverted into the fundamental information.

Besides, the transaction processing application software 22 is configured to generate a piece of transaction information via an information inputted by the user (e.g., a credit card amounts). And then the fundamental information and the transaction information can be transmitted to a remote database (e.g., bank credit certification center) by the transaction processing application software 22 via a telecommunications network.

In the above embodiment, the card reading head 11 is configured to read the fundamental information stored in the chip of the card 30 by a near field communication method (NFC), RFID or Bluetooth; therefore, the card reading head 11 does not directly contact with the card 30. The card reading head 11 is a non-contact card reading head.

Figure 5:
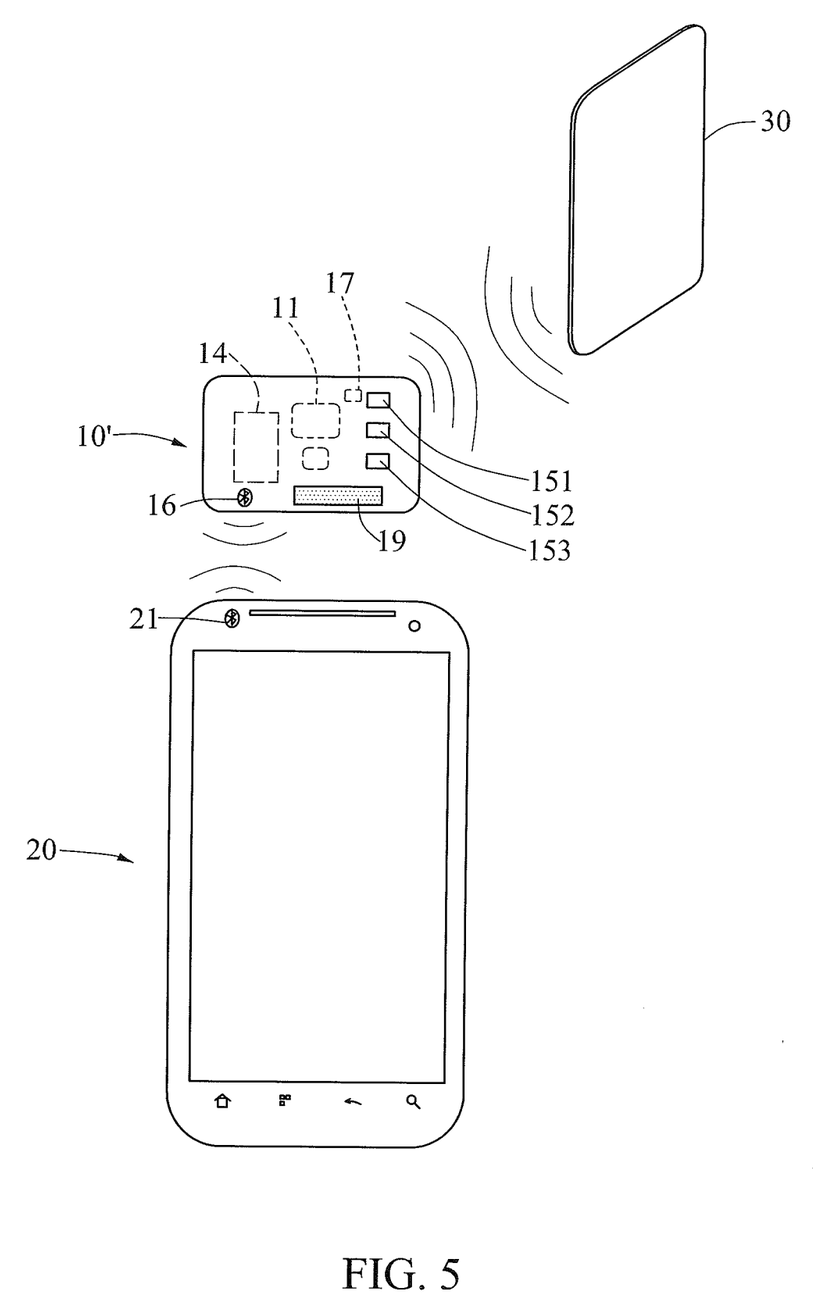
FIG. 5 illustrates a schematic diagram of the card transaction device 10' reading the card 30 in accordance with another embodiment of the present invention.

Refer to FIG. 5. FIG. 5 illustrates a schematic diagram of the card transaction device 10' reading the card 30 in accordance with another embodiment of the present invention. The card transaction device 10' further includes a buzzer 19. When the card reading head 11 reads the card 30, the microcontroller 13 not only starts the second color light LED 152 but also starts the buzzer 19. Afterward, the second color light LED 152 emits light, and the buzzer 19 issues a "beep" sound.

Figure 6:
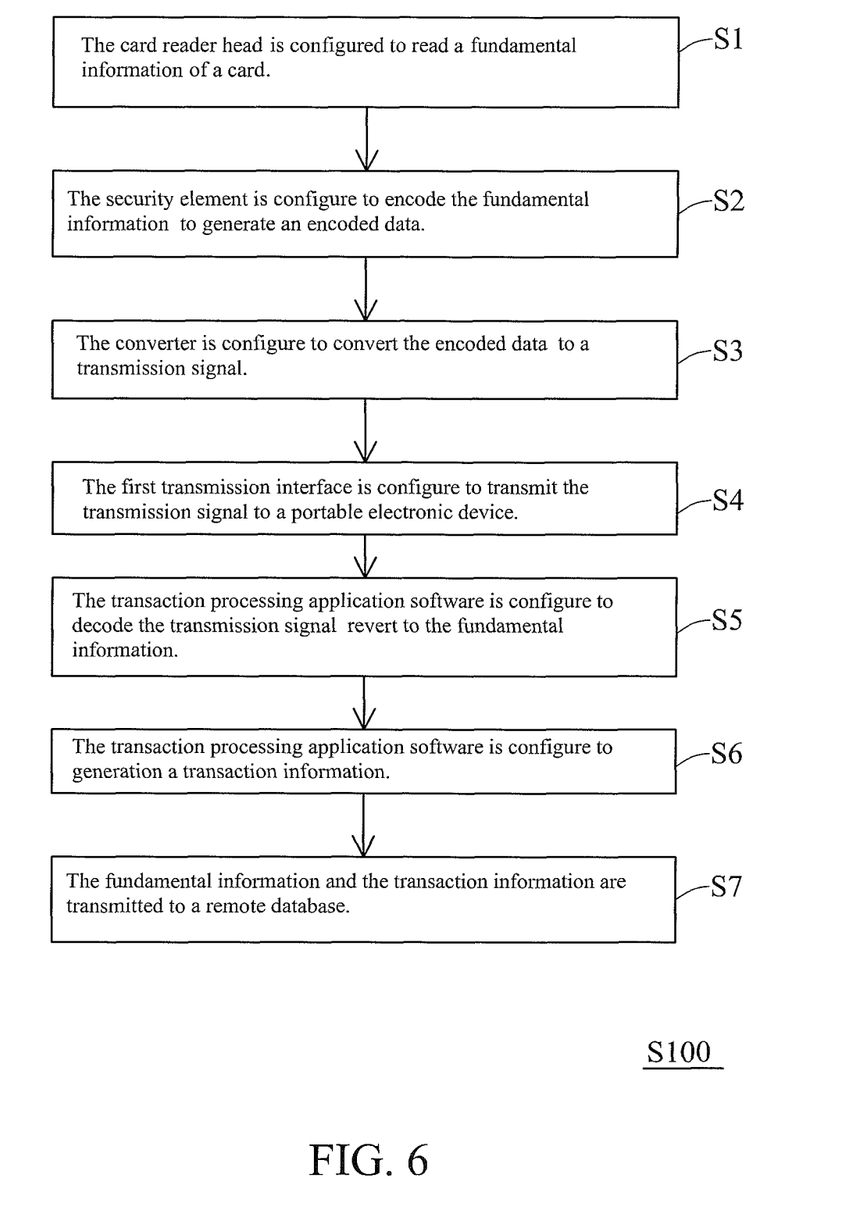
FIG. 6 illustrates a flow diagram of the card transaction method S100 in an embodiment of the present invention.
Figure 7:
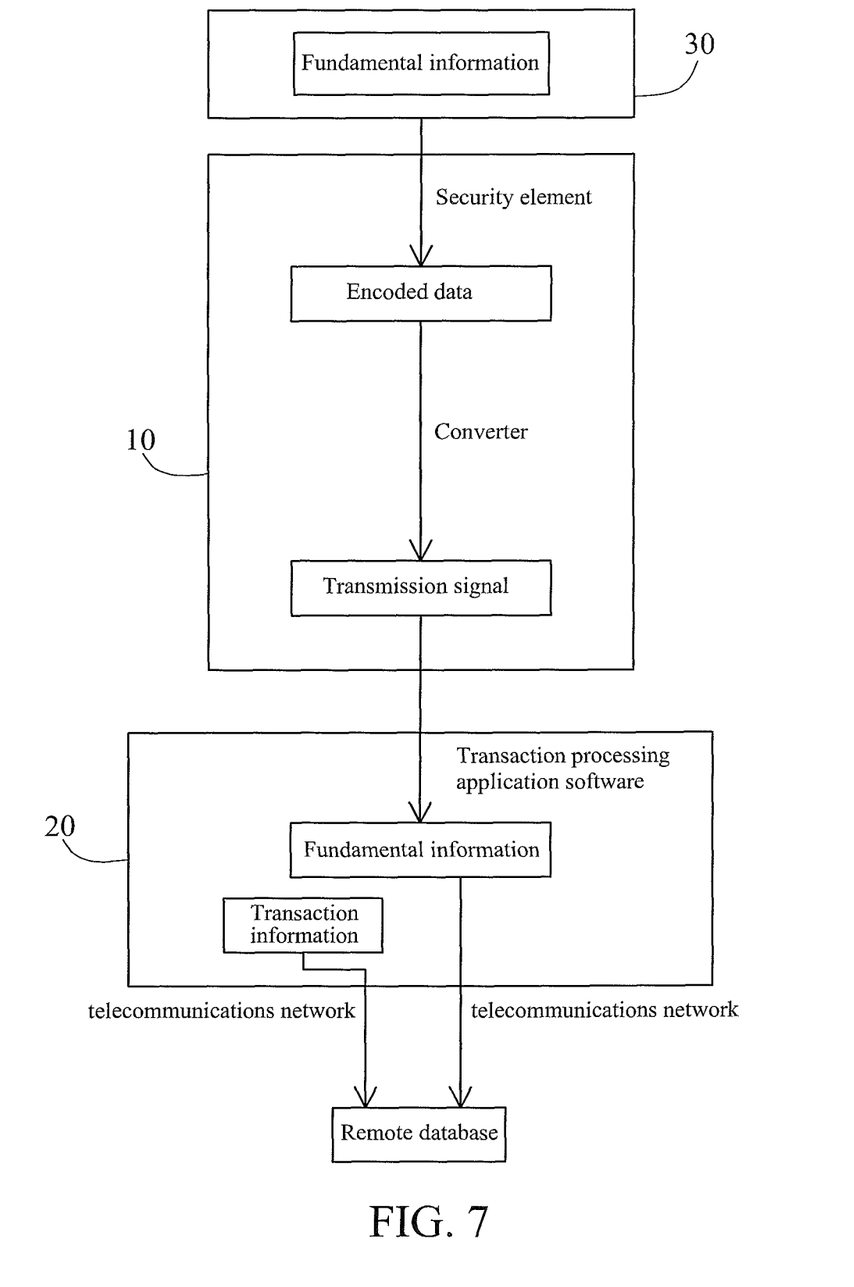
FIG. 7 illustrates a schematic diagram of a transaction procedure of the card 30 and features of the present invention.

Refer to FIG. 6 and FIG. 7. FIG. 6 illustrates a flow diagram of the card transaction method S100 in an embodiment of the present invention. FIG. 7 illustrates a schematic diagram of a transaction procedure of the card 30 and features of the present invention. By reading the description about FIG. 6 and FIG. 7, a person having ordinary skill in the art can understand the actual operating procedures of the present invention. The card transaction method S100 of the embodiment comprises the following steps:

First, as described in step S1. The card transaction device 10 and the portable electronic device 20 are provided in FIG. 3. The fundamental information of the card 30 is read by the card reading head 11 of the card transaction device 10. The first transmission interface 16 of the card transaction device 10 is communicatively connected to the second transmission interface 21 of the portable electronic device 20.

Next, as described in step S2. The fundamental information is encoded by the security element 18 to generate an encoded data. And then, as described in step S3. The encoded data is converted to a transmission signal by the converter 12 of the card transaction device 10. And then, as described in step S4. The transmission signal is transmitted to the portable electronic device 20. And then, as described in step S5. The transmission signal is decoded by the transaction processing application software 22 of the portable electronic device 20 to revert into the fundamental information.

And then, as described in step S6. A transaction information is generated by the transaction processing application software 22. And then, as described in step S7. The fundamental information and the transaction information are transmitted to a remote database by a telecommunications network. By going through the step S1~S7, the payment transaction of the card 30 would be completed.

After then, an electronic receipt are generated by the transaction processing application software 22 in accordance to the fees generated by the transaction information. The electronic receipt is transmitted to the e-mail or cell phone of the user of the card 30 by a telecommunications network. Then the encoded data in the data register 17 would be erased by the microcontroller 13 after the payment transaction of the card 30 is completed.

Figure 8:
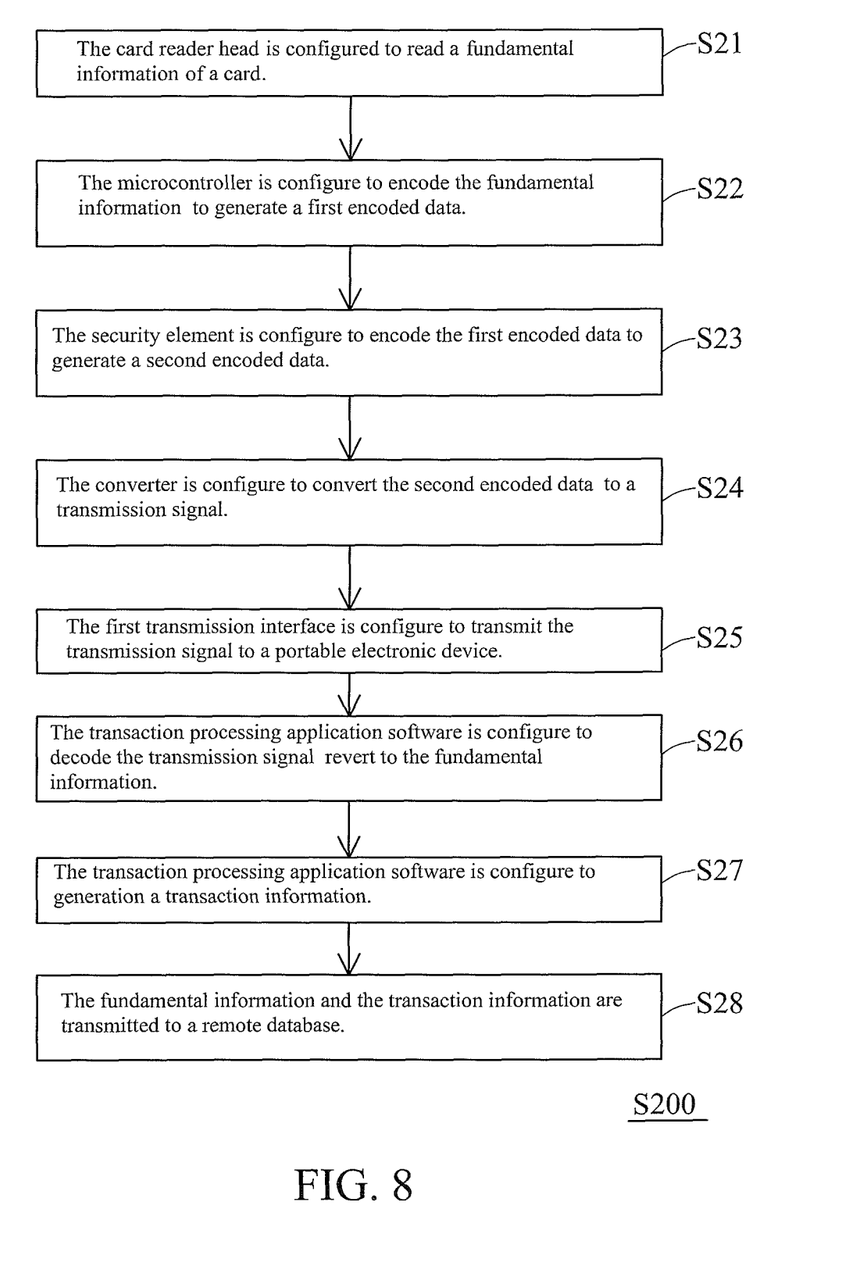
FIG. 8 illustrates a flow diagram of the card transaction method S200 in another embodiment of the present invention.
Figure 9:
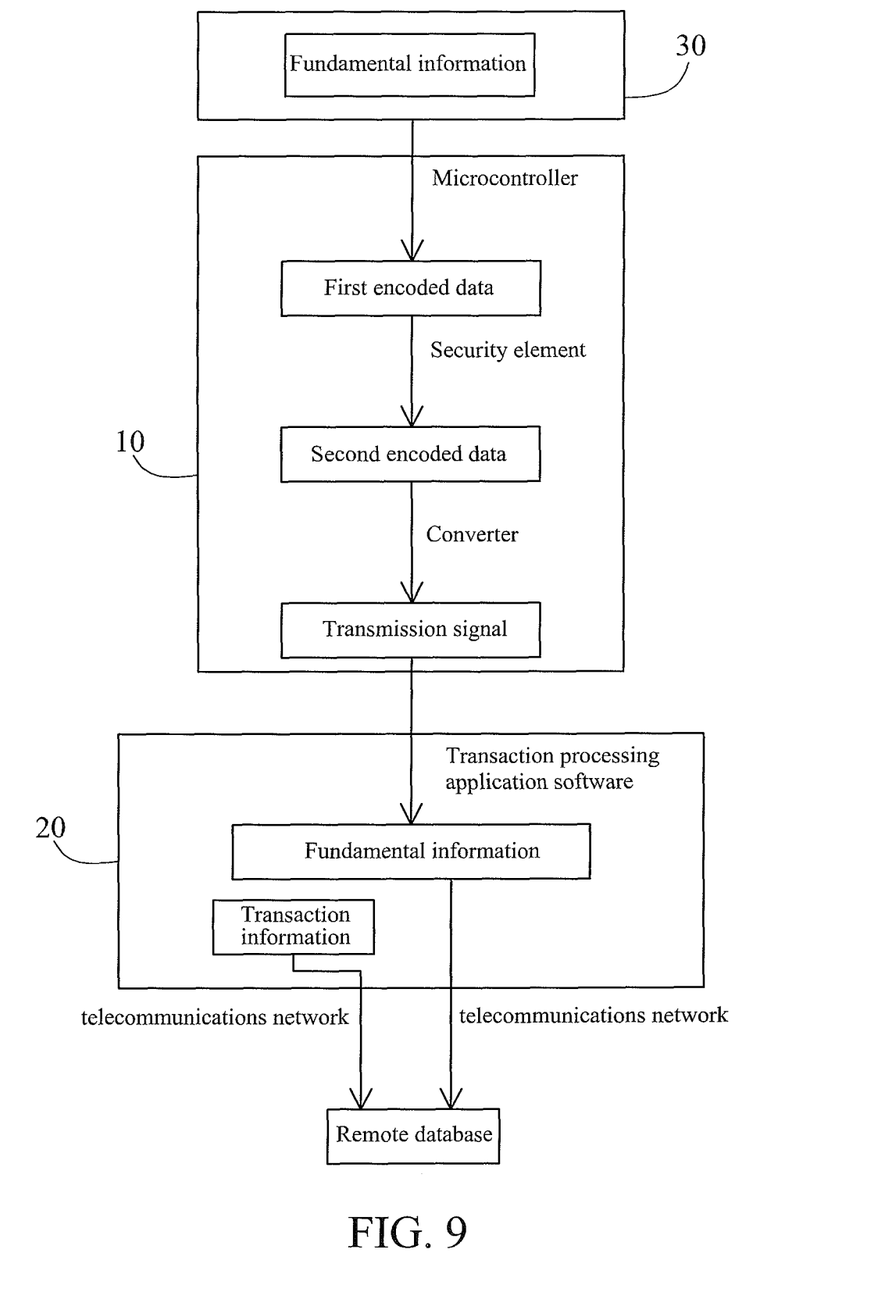
FIG. 9 illustrates a schematic diagram of another transaction procedure of the card 30 and features of the present invention.

Refer to FIG. 8 and FIG. 9. FIG. 8 illustrates a flow diagram of the card transaction method S200 in another embodiment of the present invention. FIG. 9 illustrates a schematic diagram of another transaction procedure of the card 30 and features of the present invention. The card transaction method S200 of another embodiment comprises the following steps:

First, as described in step S21. The card transaction device 10 and the portable electronic device 20 are provided in FIG. 3. A fundamental information of the card 30 is read by the card reader head 11 of the card transaction device 10. The first transmission interface 16 of the card transaction device 10 is communicatively connected to the second transmission interface 21 of the portable electronic device 20. Next, as described in step S22. The fundamental information is encoded by the microcontroller 13 to generate a first encoded data. And then, as described in step S23. The first encoded data is encoded by the security element 18 of the card transaction device 10 to generate a second encoded data. The second encoded data is saved in a data register 17 of the card transaction device 10.

And then, as described in step S24. The second encoded data is converted to a transmission signal by the converter 12 of the card transaction device 10. And then, as described in step S25. The transmission signal is transmitted to the portable electronic device 20. And then, as described in step S26. The transmission signal is decoded by the transaction processing application software 22 of the portable electronic device 20 to revert into the fundamental information.

And then, as described in step S27. A transaction information is generated by the transaction processing application software 22. And then, as described in step S28. The fundamental information and the transaction information are transmitted to a remote database by a telecommunications network. By going through the step S21~S28, the payment transaction of the card 30 would be completed.

After then, an electronic receipt are generated by the transaction processing application software 22 in accordance to fees generated by the transaction information. The electronic receipt is transmitted to the e-mail or cell phone of the user of the card 30 by a telecommunications network. Then the second encoded data in the data register 17 would be erased by the microcontroller 13 after the payment transaction of the card 30 is completed.

In summary, the microcontroller 13 of the card transaction device 10 of the present invention is configured to detect the card reading head 11 and the converter 12 periodically determines whether the card reading head 11 and the converter 12 are working properly. If the microcontroller 13 finds the card reading head 11 and the converter 12 crashed, the microcontroller 13 would reboot the card reading head 11 and the converter 12. The incidence of failure of the card transaction device 10 during operation is significantly reduced.

In addition, because the fundamental information of the card 30 is encoded at least once by the card transaction device 10, the transmission signal cannot be easily reverted to the fundamental information of the card 30 by other malicious programs. Therefore, the payment transaction using the card transaction device 10 is secure and confidential.

Although the description above contains many specifics, these are merely provided to illustrate the invention and should not be construed as limitations of the invention's scope. Thus it will be apparent to those skilled in the art that various modifications and variations can be made in the system and processes of the present invention without departing from the spirit or scope of the invention.

What is claimed is:

1. A card transaction device, used for a portable electronic device, the card transaction device comprising:
   a card reading head reading a fundamental information of a card;
   a microcontroller electrically connected to the card reading head;
   a security element electrically connected to the microcontroller; and
   a converter electrically connected to the microcontroller, and the microcontroller resetting the card reading head or the converter;
   wherein the microcontroller encodes the fundamental information to generate a first encoded data, and the security element encodes the first encoded data to generate a second encoded data, and the converter converts the second encoded data into a transmission signal.

2. The card transaction device of claim 1, further comprising a data register, wherein the data register is electrically connected to the microcontroller.

3. The card transaction device of claim 2, wherein the data register is a random access memory.

4. The card transaction device of claim 1, further comprising a first transmission interface.

5. The card transaction device of claim 4, wherein the portable electronic device further comprises:
   a second transmission interface communicatively connected to the first transmission interface; and
   a transaction processing application software generating a transaction information via a information inputted by a user.

6. The card transaction device of claim 5, wherein the transaction processing application software decodes the transmission signal so as to the transmission signal reverts into the fundamental information.

7. The card transaction device of claim 5, wherein the transaction processing application software transmits the transaction information to a remote database.

8. The card transaction device of claim 1, further comprising:
   a battery; and
   a set of warning lights electrically connected to the microcontroller, the warning lights comprising a plurality of LED.

9. The card transaction device of claim 8, wherein the LED includes a first color light LED, a second color light LED, and the third color light LED, the first color light LED is lit when a real capacity of the battery is less than a certain threshold value, the second color light LED is lit when the card reading head is reading the card, and the third color light LED is lit when the card reading head is in a standby mode.

10. The card transaction device of claim 1, further comprising a buzzer, wherein when the card reading head is reading the card, the buzzer generates a "beep" sound.

11. The card transaction device of claim 1, wherein the card reading head is a non-contact card reading head.

12. A card transaction method, the card transaction method is to be used with a card transaction device, the card transaction device comprising a card reading head, a microcontroller, a security element, a converter, and a first transmission interface, the card transaction method comprising:
   reading a fundamental information of a card by the card reading head;
   encoding the fundamental information to generate an encoded data by the security element;
   converting the encoded data into a transmission signal;
   transmitting the transmission signal to a portable electronic device by the first transmission interface;
   reverting the transmission signal into the fundamental information;
   generating a transaction information;
   transmitting the fundamental information and the transaction information to a remote database;
   wherein the microcontroller resets the card reading head or the converter.

13. The card transaction method of claim 12, wherein the card is a debit card, a cash card, or a credit card.

14. The card transaction method of claim 12, wherein the card reading head reads the card by a near field communication method.

15. A card transaction method, the card transaction method is to be used with a card transaction device, the card transaction device comprising a card reading head, a microcontroller, a security element, a converter, and a first transmission interface, the card transaction method comprising:
   reading a fundamental information of a card by the card reading head;
   encoding the fundamental information to generate a first encoded data by the microcontroller;
   encoding the first encoded data to generate a second encoded data by the security element;
   converting the second encoded data into a transmission signal;
   transmitting the transmission signal to a portable electronic device by the first transmission interface;
   reverting the transmission signal into the fundamental information;
   generating a transaction information;
   transmitting the fundamental information and the transaction information to a remote database;
   wherein the microcontroller resets the card reading head or the converter.

* * * * *